Aug. 20, 1968     R. A. PALMER     3,398,217
METHOD FOR MANUFACTURING A PROGRAM MEMBER FOR A READING HEAD
Original Filed Nov. 17, 1961
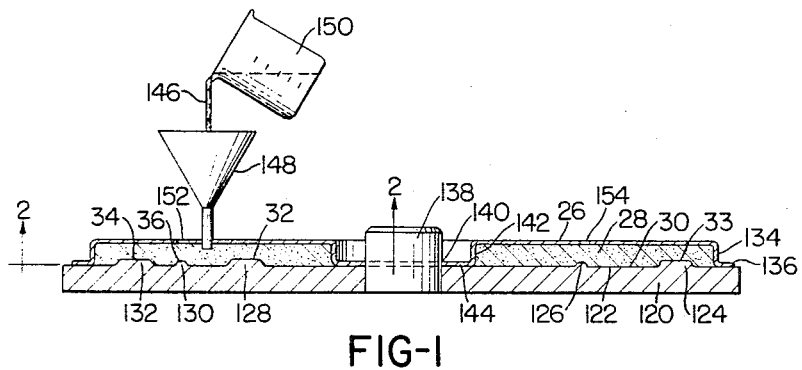
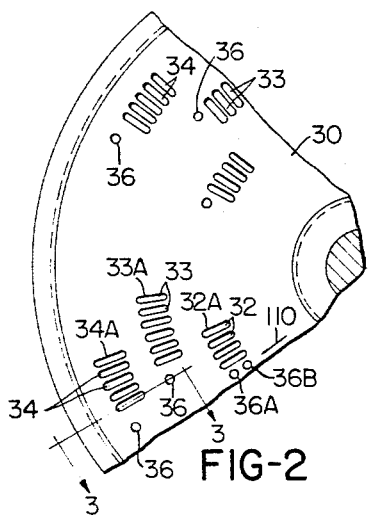
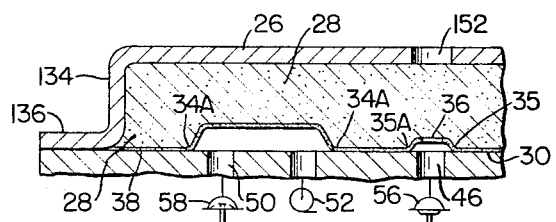
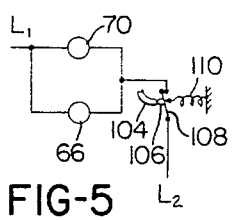
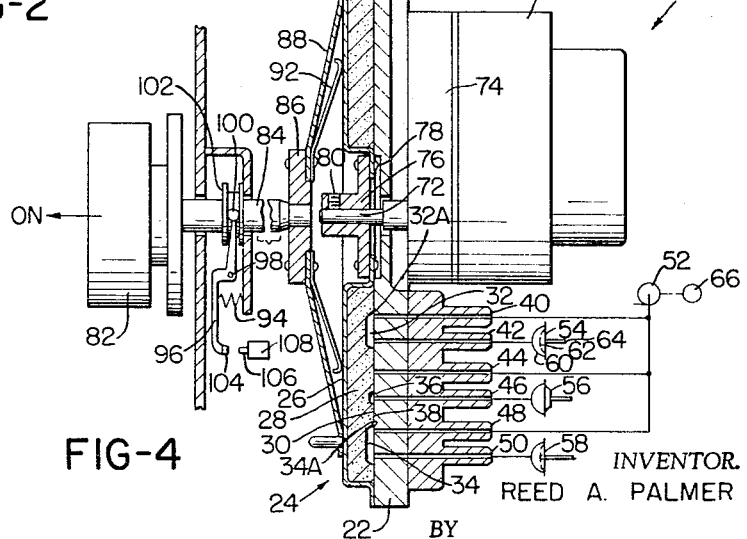
INVENTOR.
REED A. PALMER
BY
Robert R Candor
ATTORNEY United States Patent Office 3,398,217
Patented Aug. 20, 1968

3,398,217
METHOD FOR MANUFACTURING A PROGRAM
MEMBER FOR A READING HEAD
Reed A. Palmer, Los Alamitos, Calif., assignor to Robertshaw Controls Company, a corporation of Delaware
Continuation of application Ser. No. 153,046, Nov. 17, 1961. This application Feb. 12, 1965, Ser. No. 439,121
5 Claims. (Cl. 264—45)

This application is a continuation of applicant's copending application, Ser. No. 153,046, filed Nov. 17, 1961, for Program Control Member With Foam in Place.

This invention relates to a program controller, a program member and a method of making the program member.

According to this invention a program member may be made by placing a relatively rigid backing member adjacent a mold. The mold may have a generally flat surface with raised hills or domes which form indentations and the like in the surface to be molded thereon.

The backing member may have suitable flanges to engage the mold and form an enclosed space in which foam is to be introduced.

A foam producing material is then introduced into the space between the mold and backing member. The foam producing material is of a character so the foam adheres to the backing member but does not adhere to the mold. Instead the foam material forms an air tight skin with proper indentations formed by said raised hills or domes.

The backing member and the adhered foam and skin may then be removed from the mold and may be used as a program member in a pneumatic or vacuum program system. The skin may be moved over a reading head to cause the desired sequential production of vacuums in suitable vacuum actuators to produce a desired program of operations in any desired mechanism, such as a washer, machine or the like.

Accordingly, it is an object of this invention to provide a method of manufacturing a program member having one or more of the features herein disclosed.

Another object of this invention is to provide an improved method for manufacturing a program member for use with a reading head and the like and having one or more features herein disclosed.

Another object of this invention is to provide an improved method for manufacturing a program controller having a reading head and a program member and having one or more features herein disclosed.

Other objects are apparent from this description and/or from the accompanying drawings in which:

FIGURE 1 is a vertical cross section disclosing an apparatus and method for producing a program member according to this invention.

FIGURE 2 is an enlarged bottom view of the program member produced in FIGURE 1, the view taken along the line 2—2 of FIGURE 1.

FIGURE 3 is an enlarged cross section taken along the line 3—3 of FIGURE 2 and including a part of a reading head and diagrammatic representations of a vacuum pump and vacuum actuators cooperating with the reading head and with the program member.

FIGURE 4 is a diagrammatic representation of the program member in a program control apparatus and including its cooperation with a vacuum pump and a plurality of vacuum actuators.

FIGURE 5 is a diagrammatic showing of one wiring system which may be used for the system.

Certain words indicating direction or relative position are used in this application for the sake of brevity and clearness. However, it is to be understood that such words are used in connection with the illustrations in the drawings of the application, and that the actual devices need not have the relative positions or directions actually shown or described. Words which may be used for this purpose are: "below," "horizontal," "vertical," etc.

Referring first to FIGURE 4, a vacuum controlling system may include a program controller 20 having a reading head 22 and a program member 24 movable over the reading head 22. The program member may have a relatively rigid backing member 26 and a porous foamed material 28 with the foam adhering to the rigid member 26. The program surface 30 is made of a skin produced by the foamed material and having program producing irregularities such as indentations 32 and 34 and an opening 36.

The reading head 22 may be a solid block 22 which has a relatively smooth reading head surface 38. The reading head may also have a plurality of passages 40, 42, 44, 46, 48, and 50, more or less. The passages 40 through 50 may terminate at the reading head surface 38 in ports which cooperate with the irregularities 32, 36, and 34, etc., to produce a program of sequential operations in a controlled apparatus, such as a washing machine or the like. Desired sequences are determined by the shapes, spacings, etc., of the irregularities in the program member 30, as will become apparent.

The passageways 40 through 50 may, for example, be connected by suitable tubes respectively with a vacuum pump 52 and the vacuum actuators 54, 56, and 58. The vacuum actuators may include, for example, a hermetic vacum chamber dome 60 and a flexible diaphragm 62. The diaphragm may be connected by the shaft 64 with a member to be controlled, such as a valve, switch, or other device. The construction of the vacuum actuators may be such that the shaft 64 is pulled leftward when a vacuum is produced in the vacuum chamber 60. The construction also is such that the vacuum may be broken in the vacuum chamber 60 to admit atmospheric air into the chamber 60 and then the bias applied to the diaphragm 62 will push the shaft 64 rightward. The bias may be produced by spring action, or the like, not shown, which may be applied to the shaft 64 or to the actuated device, not shown, which itself may be biased toward the right.

The vacuum pump 52 may be actuated by the vacuum pump motor 66.

The reading head 22 may be stationary and the ports at the left end of the passages 40 through 50 may also be stationary. The program member 24 may be in the shape of a plate or disc. The program member is movable relatively to the reading head 22 sequentially to bring the irregularities 32, 34, and 36 into proper cooperation with the ports of the passageways 40 through 50. The irregularities 32, 34, and 36 produce proper air passageways to produce the desired sequences in the vacuum actuators 54, 56, 58 and any other actuators that may be desired. When a channel or indentation bridges the ports of passageways 40 and 42, for example, the diaphragm 62 is moved leftward when the pump 52 produces a vacuum in the vacuum chamber 60. This moves the shaft 64 leftward to open a valve or the like. When an opening 36 passes over a port of the passageway 42 the vacuum is broken in the dome 60 and the diaphragm 62 and shaft 64 move rightward to close the valve, or vice versa. As the member 24 rotates, the various indentations 32, 33, and 34 and openings 36 cause desired operations by the actuators 54, 56, and 58.

When the program member is in the form of a disc or plate, the program member may be moved by a program motor 70 which may rotate the shaft 72 at reduced speed through the medium of speed reduction gearing, and a slip clutch, not illustrated, but which may be located in the gear casing 74 to produce the desired speed of rotation of the shaft 72. The shaft 72 may be connected to the rigid backing member 26 by means of a hub 76 which may be secured to the rigid member 26 by rivets 78 and which may be connected to the shaft 72 by the screw 80. The motor 70 rotates the disc or program member 24 at a relatively slow speed to produce the desired sequences in the program.

The program member 24 may be set at any desired position by the handle 82. The handle 82 may, if desired also control the starting and stopping of the motors 66 and 70.

Any desired connection between the handle 82 and the program member 24, and the motors 66 and 70 may be used. The construction may be such that when the handle 82 is moved towards its rightmost position, or "OFF" position, the program system is de-energized and stationary. When the handle 82 is pulled to its leftmost position, or "ON" position, then the program system is placed in operation to produce one or more programs, which are embossed on the skin 30. The handle 82 may be connected to the program member 24 so that it may rotate the program member to any desired position such as at the beginning of a program, or at any intermediate stage of the program, or at the end of the program, as desired. To this end, the shaft construction 84 may be connected to a hub 86 which carries the arms 88 which engage the pins 90. These pins 90 are secured to the backing member 26. The fingers 88 may move leftward or rightward along the pins 90 while following the rightward or leftward movement of the handle 82. However, the fingers 88 remain in rotational driving engagement with the pins 90 and program member 24. In addition, leaf springs 92 may be carried by the hub 86 and may press against the backing member 26, to produce a slight rightward bias in the program member 24 so the skin 30 is pressed against the surface 38 of the reading head. This produces an efficient air flow from the actuators 54, 56 and 58 to the vacuum pump 52.

The handle 82 may be biased to the "OFF" position, or the rightmost position, by a spring 94, or the like, which may be stronger than the leaf springs 92. The spring 94 may bear against a lever 96 which may be fulcrumed at 98 so the end 100 may move the shaft 84 through the medium of the grooved washer construction 102, or vice versa. The washer construction 102 is fixed to the shaft 84. The lever 96 may also have an end 104 which may engage the small plunger 106 of the switch 108. The plunger 106 and switch 108 may be leftwardly biased by any springed construction 110. FIGURE 5, so that when the handle 82 is moved to the rightmost or "OFF" position the plunger 106 is released by the leftward movement of the end 104 of the lever 96. This movement opens the switch 108 and thus opens the circuits of the motors 70 and 66, as shown in FIGURE 5, to stop the program member 24 and to stop the operation of the vacuum pump 52.

The flexible skin surface 30 may be provided with the indentations 32, 33, and 34 which may be in the form of closed end channels which respectively may bridge the passageways 40 and 42, 44, and 46, and 48 and 50. The foam formed by the porous foamed material may also have corresponding indentations, as shown in FIGURE 3. The passageways 40, 44 and 48 may be connected to the vacuum pump 52 and the passageways 42, 46, and 50 may be connected to the vacuum actuators 54, 56, and 58. The construction is such that the bridging members or channels 32, 33, and 34 join the passageways 40 through 50, so that whenever any pair of passageways is bridged or joined, the vacuum pump 52 produces a vacuum in the respective vacuum actuator 54, 56 or 58 as the case may be. If desired, each series of channels 32, 33 or 34 may contain channels which are so closely spaced to each other that they produce a substantially continuous vacuum action in the respective vacuum actuator because the spacing of the channels 32, 33, and 34 is close enough so that there will always be a respective channel partly or wholly over the particular ports of the passageways 40 through 50 while a series of channels is passing over a pair of ports. When a series of channels 32, 33 or 34 has completed the desired length of actuation, then the vacuum may be broken in the respective vacuum chambers 60 by causing an opening 36 to pass over the port corresponding to any of the passageways 42, 46 or 50. The holes 36 allow atmospheric air to pass through the respective passageway to the vacuum chamber 60 and thus break the vacuum in the vacuum actuator to permit the respective shaft 64 to move rightward to unactuated condition. The spring bias, not shown, which is produced in the respective shaft 64 returns the shaft to its rightward position and pulls its respective diaphragm 62 with it to the unactuated position such as shown at 56 from the actuated positions which are shown in dotted lines at 54 and 58.

In FIGURE 2 the program surface 30 moves clockwise. When the program has progressed to the end of the program cycle, such as at the radius line 110, then the handle 82 is moved rightward by suitable mechanism not shown, and the passageways 40 and 42 are exposed to the atmosphere by the holes 36A and 36B to break the vacuum in the vacuum system. In the specific illustration only the channels 32 had been subjected to vacuum just prior to the end of the program, so that the breaking of the vacuum in the pump 52 and the actuator 54 completes the vacuum breaking sequence.

The vacuum in actuators 56 and 58 had previously been broken by the last openings 36 which followed the last series of channels 33 and 34 respectively, one vacuum breaking operation being shown in FIGURE 3.

The program members 24 may be produced by the apparatus and method disclosed in FIGURE 1 to provide a desirable gently pressed surface 30 against the reading head 22. For example, a mold 120 may be provided. It may be a relatively flat member having a smooth surface 122 provided with hills 124, 126, 128, 130, 132 and other similar hills circumferentially around the mold to produce the various indentations 32, 33, and 34 of the character illustrated in FIGURE 2 and also to produce the small indentations 35 in which the openings 36, FIGURE 3, may be punched out or bored out after the program member has been removed from the apparatus of FIGURE 1.

The relatively rigid backing member 26 may be in the form of a disc, having a circumferential wall 134 and an outward flange 136. The flange 136 may be held tightly against the mold 120 in a more or less fluid tight condition. In addition, a stationary shaft like plug 138 may be held by the mold 120 and is adapted to receive the edge of the opening 140 of the backing member 26. If desired, the backing member 26 may be provided with an inner vertical wall 142 and an inwardly directed flange 144, which flange may also be held relatively tightly against the mold 120.

A release agent, or anti-adhesion agent, may be applied to the mold surface 122 to prevent the foam material 28 from adhering to the surface 122 of the mold 120. A properly mixed and compounded foaming mixture 146 may be poured or otherwise introduced through a funnel or the like 148 into the space between the backing member 26 and the mold 120. The foaming material may be of the character now on the market and well known, which will produce a foam, as indicated at 28. The foam is of such a character that it adheres to the untreated surface of the relatively rigid backing member 26. However, the foam does not adhere to the treated surface 122 of the mold 120, since the same has been treated or covered with the release agent heretofore described. However, the foaming mixture 146 is of a character that it produces a skin at 30 which is vacuum tight and somewhat flexible.

The skin 30 is of such a character that it glides smoothly and somewhat tightly over the reading head surface 38. This causes the channels 32, 34, and 36 to have their margins 32A, 33A, 34A sealed to the reading head surface 38. Hence the channels 32, 34, and 36 efficiently join the pairs of passageways 40–50 to permit the vacuum pump 52 to produce the desired vacuums in actuators 54, 56, and 58. Likewise the margins 35A are also sealed to the reading head surface 38.

Many types of foaming mixtures may be purchased in package condition, so that the necessary ingredients may be mixed together in a container, such as beaker 150, and then may be quickly poured through a funnel or the like into the desired space where the mixture foams. This foam, when completely reacted and jelled may be porous, if desired.

Suitable openings 152 may be provided in the backing member 26, to permit atmospheric air to pass through the foam 28 into the openings 36 which have been punched in the small indentations 35. The air is filtered by the foam and then enters the openings 36 and may be discharged into the vacuum chambers of the respective actuators 54, 56 or 58. Also similar openings may be provided adjacent the vacuum breaking openings 36A, 36B of FIGURE 2 or anywhere else, as at 154 opposite an opening at 126, FIGURE 1.

One type of foam producing material may be measured and mixed urethane mixed with a proper foaming agent to produce a foam 28 and a skin 30 of the proper characteristics, and which may adhere to the backing agent 26.

The program member which has been produced by the apparatus and method of FIGURE 1 may be removed from the mold 120. The hub 76 may then be applied thereto, which in turn may be secured to the shaft 72 to produce the program apparatus of FIGURE 4.

Suppliers of foaming material, for example, are Napco Chemical Company of Harrison, N.J., the Dayton Rubber Company of Dayton, Ohio, etc.

It is thus to be seen that a method and an apparatus for manufacturing a program member has been provided. Also a new program member has been provided. A new program controller has also been provided which is adapted to use the program member heretofore described.

While the form of the invention now preferred has been disclosed as required by statute, other forms may be used, all coming within the scope of the claims which follow.

What is claimed is:

1. The method of manufacturing a program member for a reading head, said program member having a relatively rigid backing member and a resilient foam produced by a porous foamed material with the foam adhering to said rigid member and with a sealing program surface made of a fluid tight skin produced by said foamed material, said skin having program controlling fluid transmitting irregularities, which method comprises providing a mold member with a mold surface shaped to produce said irregularities, and said surface being repellent to adhesion of said foamed material, placing said rigid backing member adjacent said mold, and introducing foam producing material between said backing member and said mold surface, said material producing a foam which adheres to said backing member and which jells to produce a resilient foam and to produce a skin having said program controlling fluid transmitting irregularities.

2. A method according to claim 1 which includes producing said program member in the form of a disc having a disc shaped relatively rigid backing member having substantially cylindrical outer and inner walls, a disc shaped resilient foam self adhered to said backing member, and a disc shaped somewhat flexible skin formed by said foam producing material against said mold, said skin and foam having a plurality of program controlling vacuum pressure air transmitting closed end channels arcuately arranged side by side and so closely spaced to each other that they can produce a substantially continuous vacuum transmission action between a pair of reading head ports over which said channels can be relatively rotated, said skin having a vacuum breaking opening adjacent one of said channels through which atmospheric air filtered by said foam can pass into one of said ports.

3. The method of manufacturing a program member for a reading head, which method comprises providing a mold member with a mold surface shaped to produce irregularities, and placing foam producing material against said mold surface to cause said material to foam and produce a skin against said surface with jelled porous foam on one side of said skin, said skin having program controlling fluid transmitting irregularities for use with said reading head produced in the other side thereof and including the step of forming program controlling fluid transmitting aperture means through said skin to interconnect said other side thereof with said porous foam.

4. The method of manufacturing a program member for a reading head, which method comprises providing a mold member with a mold surface shaped to produce irregularities, and placing foam producing material against said mold surface to cause said material to foam and produce a skin against said surface with jelled porous foam on one side of said skin, said skin having program controlling fluid transmitting irregularities for use with said reading head produced in the other side thereof and including the step of placing said foam producing material between a rigid backing member and said mold whereby said rigid backing member becomes a part of said program member.

5. The method as set forth in claim 6 and including the step of forming aperture means through said rigid backing member to interconnect the exterior thereof with said porous foam.

References Cited

UNITED STATES PATENTS

| 1,952,528 | 3/1934 | Bedford | 18—59 |
| 2,898,634 | 8/1959 | Alderfer | 18—59 |
| 2,773,353 | 12/1956 | Oishei | 60—60 |
| 3,123,976 | 3/1964 | Mansell | 60—60 |
| 1,876,166 | 9/1932 | Randall | 264—45 |
| 2,326,504 | 8/1943 | Smith | 264—54 X |
| 2,381,380 | 8/1945 | Carter | 264—54 X |
| 3,133,978 | 5/1964 | Bartley et al. | 264—54 X |
| 3,163,687 | 12/1964 | Einhorn | 264—54 |
| 3,165,483 | 12/1965 | Gemeinhardt et al. | 260—2.5 |
| 3,210,300 | 10/1965 | Leibu et al. | 260—2.5 |

FOREIGN PATENTS

| 744,165 | 1/1956 | Great Britain. |
| 1,280,851 | 11/1961 | France. |

JAMES A. SEIDLECK, *Primary Examiner.*

P. E. ANDERSON, *Assistant Examiner.*